Patented July 4, 1933

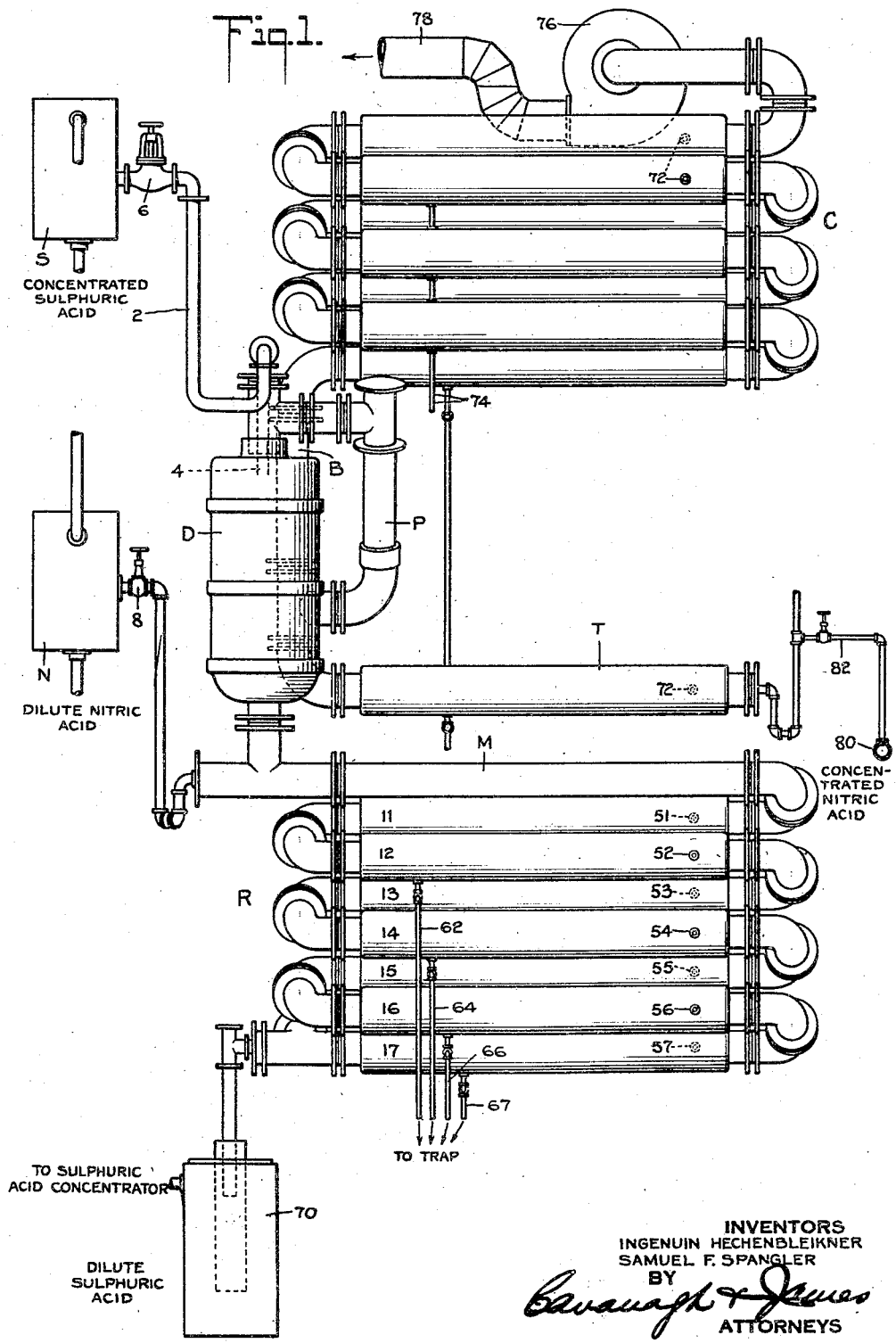

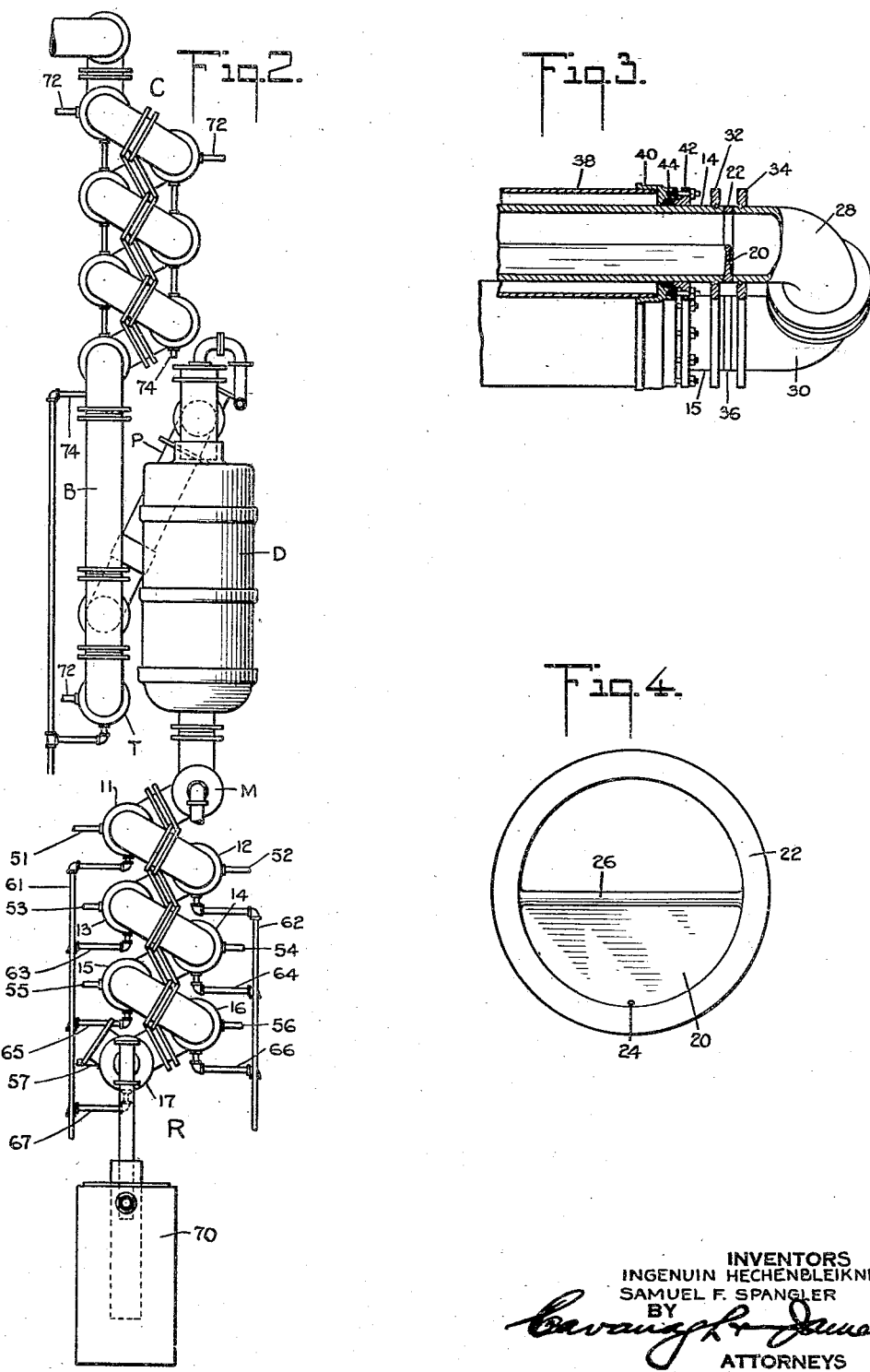

1,916,837

UNITED STATES PATENT OFFICE

INGENUIN HECHENBLEIKNER, OF CHARLOTTE, NORTH CAROLINA, AND SAMUEL F. SPANGLER, OF PHILADELPHIA, PENNSYLVANIA, ASSIGNORS TO CHEMICAL CONSTRUCTION CORPORATION, OF CHARLOTTE, NORTH CAROLINA, A CORPORATION OF NORTH CAROLINA

NITRIC ACID CONCENTRATION

Application filed May 9, 1930. Serial No. 450,912.

This invention relates to nitric acid concentration by the use of a dehydrating agent, such as sulphuric acid, and to apparatus therefor.

In copending applications of Ingenuin Hechenbleikner, one of the present applicants, Serial No. 256,561, filed February 24, 1928, and Serial No. 352,093 filed April 3, 1929, a nitric acid concentration system is disclosed in which the distillation or removal of nitric acid vapor from a mixture of nitric and sulphuric acids is accomplished in a plurality of retort tubes or pipes. In order to conserve floor space, the retort tubes are superposed, and the desired liquid content is retained in the tubes by the use of dams at the discharge ends thereof. The water content of the nitric acid is, in the main, removed by the sulphuric acid, although some water vapor may incidentally be distilled off with the nitric acid vapor.

It has been found difficult to obtain nitric acid of very high concentration from such an arrangement, particularly so when operating the same at commercial capacities, by which we mean a capacity or output which will justify the cost of installation of such a concentration system in comparison with other kinds of concentration systems. The primary object of the present invention is to retain the compactness or floor space economy of the aforesaid system, and at the same time to so alter the system and the method of operation of the same that a large yield of highly concentrated nitric acid may be obtained.

To this end, we add to a vertically superposed group of series connected retort tubes a dehydrating tower connected to the uppermost tube. The sulphuric acid, after flowing downwardly through the dehydrating tower, is mixed with the dilute nitric acid, and the acid mixture flows through the retort tubes. The acid mixture in each of the tubes is kept at its boiling point in order to evolve nitric acid vapor, and this, together with some water vapor incidentally driven off from the acid mixture at the same time, flows out of the retort system into the dehydrating tower where any such water vapor is removed from nitric acid vapor by the sulphuric acid descending in the tower. It will thus be seen that in the present arrangement the dehydrating function of the sulphuric acid is employed doubly, primarily to remove water from the dilute nitric acid liquid, and secondarily, to remove water vapor from the concentrated nitric acid vapor.

As has already been indicated, a quantity of acid mixture is retained in each of the retort tubes by a dam at the discharge end thereof. The space above the liquid content being open, a continuous passage for the flow of vapor upward through the retort system is provided. We have found it desirable to make the level of the liquid retained in each of the retort tubes adjustable, so that the quantity of acid mixture in any of the tubes may be determined independently of the level established in the other tubes. For this purpose we provide means for adjusting the liquid content in each of the tubes independently of the other tubes, and this means most simply consists of interchangeable and adjustable dams inserted at the discharge end of the tubes. The most desirable levels to be employed may be determined empirically and experimentally, and generally speaking, we find it desirable to reduce the depth of acid mixture in the upper tubes relative to that in the lower tubes. Presumably this results from the fact that the quantity of evolved gas flowing through the tubes increases cumulatively as the upper tubes are reached, and it proves desirable to increase the space allowed for both the evolution of gas from the tube in question and the passage of gas from all of the preceding or lower tubes.

In the concentration system disclosed in the applications of Ingenuin Hechenbleikner the retort tubes are heated by steam jackets all supplied with steam from a common supply pipe. This, theoretically, tends to hold the temperature applied externally to the tubes constant, but inasmuch as considerable heat is liberated in the upper tubes simply as a result of the mixing of the sulphuric and nitric acids, the final temperatures in the various tubes differ. In some installations, the steam distribution itself is apt to become unequal and irregular, and retort tubes may occasionally buck rather than aid one another. Furthermore, the operation of the present system is such, due to the removal of water vapor in the dehydrating tower and not in the tubes, that optimum results may be obtained by maintaining the acid mixture at the boiling point at all times in all of the retort tubes, and unless this is done, the degree of denitration is decreased, and excessive losses are caused. Inasmuch as the acid mixture in each of the retort tubes differs from that in the other tubes, the boiling temperatures also differ.

Accordingly, still another object of our invention resides in the provision of independent means to heat the retort tubes so that the temperature in at least some of the tubes may be controlled independently of the temperature in the other tubes. In the particular system here disclosed, this is accomplished by the use of individual steam jackets for each of the tubes, and individual steam supply pipes connected thereto, so that the pressure and consequently the temperature in each of the tubes may be controlled independently of that in the other tubes.

To insure uniform operation, it is necessary that the nitric and sulphuric acids be well mixed and not permitted to stratify in layers, and to accomplish this is still another object of our invention. Thorough mixing may readily be obtained if accomplished in a large volume of liquid and, accordingly, we keep the level of the acid mixture in the uppermost tube relatively high. However, to permit sufficient space for the passage of gas from the lower tubes, it is desirable to reduce the evolution of gas within this tube. Also, the heat of mixing of the acids is greatest at this point, and we find that considerable distillation of nitric acid vapor may be obtained as a result of this heat alone. An important feature of our invention resides in the discovery that the first tube may be left unheated, and that improved operating efficiency may be obtained thereby. In effect, therefore, we provide between the system of retort tubes and the dehydrater, an additional tube which we call a mixer tube.

The evolution of nitric acid vapor in each of the retort tubes depends not only upon the temperature maintained therein, but also upon the length of time during which a given quantity of acid mixture is exposed to that temperature. This, ultimately, is a factor of the velocity of flow of acid mixture through the system which, in turn, depends upon the output or capacity of the system and the cross sectional area of the tubes, assuming, as is generally the case, that approximately similar portions of the various tubes are used for liquid flow in various installations. In our arrangement the tubes are given a cross sectional area sufficiently great, relative to the quantity of nitric acid manufactured daily, to reduce the velocity of flow through the tubes to a value giving optimum yield. More specifically, we find that the system should be provided with tubes having a cross sectional area of from 5 to 20 and preferably about 8 square inches per ton of nitric acid manufactured daily.

The dehydrated nitric acid vapor leaving the dehydrating tower is passed through an appropriate condenser, in which it is liquefied and finally collected as the desired concentrated nitric acid. We prefer to locate the condenser directly above the retort tubes inasmuch as this arrangement is the most economical of floor space. However, the addition of a condenser and a dehydrating tower to the bank of retort tubes causes the structure to assume considerable height, and to economize in ceiling height as well as floor space is another object of the present invention. To accomplish this, we arrange the horizontal retort tubes in zigzag vertical superposition rather than simple linear vertical superposition. In this manner the necessary height of the bank of retort tubes and of the bank of condenser tubes may each be halved without in any way sacrificing the desirable features of simple vertical superposition.

To the accomplishment of the foregoing and such other objects as will hereinafter appear, our invention consists in the nitric acid concentration method and apparatus as hereinafter are more particularly described in the specification and sought to be defined in the claims. The specification is accompanied by drawings in which:

Fig. 1 is a front elevation of a nitric acid concentration system constructed in accordance with our invention;

Fig. 2 is a side elevation of the same;

Fig. 3 is a detail section through a retort tube; and

Fig. 4 is a dam.

Referring to the drawings, a dehydrating agent, preferably sulphuric acid, flows from a tank S downwardly through a dehydrating tower D and thence into a mixer tube M. The dilute nitric acid to be concentrated flows from a tank N into the tube M in which it is mixed with the sulphuric acid. The acid mixture flows downwardly through a vertically superposed bank of retort tubes R heated by individual steam jackets. Separate bodies of acid mixture of different strengths are retained in the retort tubes by dams located at the discharge ends thereof, such a dam being shown in Fig. 4, and its mode of application to the retort tube being shown in Fig. 3.

Nitric acid vapor is evolved from the acid mixture in each of the retort tubes, and this vapor, along with some water vapor incidentally evolved therewith, flows upward through the retort tubes R, the mixer tube M, and the dehydrating tower D. During its passage through the tower D the water vapor is removed by the descending sulphuric acid. The dehydrated nitric acid vapor flows from the top of the tower downwardly through interconnecting pipe P and then upwardly through a bleacher pipe B and into a bank of water jacketed condenser tubes C in which the nitric acid vapor is condensed to a liquid which flows back down through bleacher pipe B in which it is bleached by the rising nitric acid vapor, and thence into a water jacketed collecting tube T from which the concentrated nitric acid is led to any suitable storage tank.

Considering the system more in detail, tank S is supplied with warm sulphhuric acid having a strength of from 88 to 91%, and the rate of flow thereof downwardly through pipe 2 and distributing nozzle 4 in the dehydrating tower D is controlled by any suitable regulating device or valve 6. The dehydrating tower D is only partially, say half, filled with a loose packing such as stacked spiral rings, over which the sulphuric acid discharged from the nozzle 4 sprays, and through which the acid trickles and is broken into small streams in order to make intimate contact with the nitric acid and water vapors rising upwardly therethrough.

The sulphuric acid leaving the tower D flows into the mixer tube M which is provided with a dam at its discharge end for retaining a considerable volume of liquid in the tube. Weak nitric acid to be concentrated having a strength of, say 44 to 58%, flows from the tank N through a regulating device or valve 8 and into the mixer tube in which it becomes mixed with the sulphuric acid. It should be noted that the mixer tube M is unheated and need not be provided with a heating jacket. This is because the heat developed by the mixing of the acids is alone sufficient to cause the desired evolution of nitric acid, and also because excessive distillation is not desired in the mixer tube because a considerable volume of liquid is preferred in order to insure thorough mixing of the sulphuric and nitric acids, and the space above this liquid is needed to accommodate the flow of the considerable volume of nitric acid and water vapors evolved in the various retort tubes R. In this specific case, the dam in the mixer tube M keeps the same half full of the acid mixture.

From the mixer tube M, the acid flows downward through a series of vertically superposed retort tubes 11, 12, 13, 14, 15, 16, and 17, each of which is provided at its discharge end with a dam for retaining a body of acid mixture in the tube.

A front elevation of a suitable dam is given in Fig. 4, referring to which the dam 20 is provided with a smooth rim 22 cast integrally therewith so that the dam may be clamped between the fittings at the end of the retort tube. The dam 20 may also be provided with a tiny aperture 24 at the lowermost edge thereof through which the liquid content of the retort tubes may drain when the plant is shut down for any reason. Dams, such as that illustrated in Fig. 4 may be provided, in which the overflow edge or lip 26 is at different heights so that the level of liquid in one retort tube may be determined independently of the level in the other tubes. It should also be noticed that the rim 22 is not provided with bolt holes or the like, and that the dam may therefore be turned as desired before locking the same between the fittings at the end of the retort tube. This tilting of the dam may be used to vary the level of liquid maintained in the retort tubes when it is not desired to remove the dam for replacement by another.

The manner in which the dam is located and functions is clearly evident from Fig. 3 in which a retort tube such as the tube 14 is connected to the next succeeding retort tube 15 through pipe elbows 28 and 30. The rim 22 of the dam 20 is clamped between the tube 14 and the elbow 28 when the flanges 32 and 34, respectively located on the tube 14 and the elbow 28, are clamped together, preferably by clamping bolts not shown in the drawings. A blank ring 36 is clamped between the tube 15 and the elbow 30 in order to space the same correctly when taking account of the dam 20.

The dam for the mixer tube M and the manner of placing the same have not been described in detail because they may, and preferably do, coincide with the description already given for the retort tubes. This is done in order that uniform fittings may be employed throughout the system, thereby simplifying the problem of replacement and spare parts.

The use of the dams 20 in the manner described makes it possible to adjust the liquid level in each of the tubes independently of the other tubes. The best levels may be determined by experiment, and in general the level should be decreased in the upper tubes relative to that used in the lower tubes in order to increase the space provided for the flow of acid vapor. In the specific case here described, the dams in tubes 11, 12, and 13 keep these tubes about 3/8 full of liquid, while the dams in tubes 14, 15, 16, and 17 are arranged to keep the tubes 1/2 full of liquid. The mixer tube is also kept 1/2 full of liquid.

The retort tubes 11—17 are preferably independently heated in order to make individual temperature control possible. In the present case, the retort tubes are heated by steam jackets which surround the retort tubes and which may be mounted thereon in any conventional manner, such as that illustrated in Fig. 3. Referring to that figure, the steam jacket 38 has attached thereto at each end a collar 40 with which a gland 42 cooperates so as to compress packing 44 around the retort tube 14, and thereby prevent leakage of steam from the jacket.

Reverting to Figs. 1 and 2, the steam jackets for the tubes 11—17 are each supplied with steam from separate steam pipes respectively numbered 51—57. The pressure of the steam supplied to each of the jackets may be regulated, and consequently the temperature and heat applied to the various tubes. The condensed steam from the jackets is drained through drain pipes 61—67 which lead to appropriate trap means for permitting the discharge of water but not of steam. In the case here illustrated, the steam pressure supplied to the tubes ranges from about 190 to 240 pounds, the highest pressure being applied to the tube 17. It will be understood that the steam jackets of the retort tubes may be arranged in a plurality of groups, the steam pressure supplied to each of which is regulatable independently of the other groups, instead of employing the ultimate arrangement here illustrated in which each steam jacket may itself be independently controlled. It should further be understood that the retort tubes may be heated by means other than steam jackets, as, for example, electrical heating by resistance or by induction, so long as the requirement that the temperature applied to some of the tubes be controllable independently of the temperature of the other tubes is fulfilled.

The nitric acid content is distilled off in the successive retort tubes, and the residual sulphuric acid, which is practically free of all nitric acid, flows from the retort tube 17 into a sulphuric acid cooler 70, from which it is re-concentrated to a strength suitable for repeated use in the sulphuric acid supply tank S. The residual sulphuric acid in the cooler 70 may have a strength of, say, 72 to 76% and a nitric acid content of less than .3%. This acid is concentrated to about 88 to 91% before being returned to the sulphuric acid supply tank S.

The nitric acid vapor distilled in the retort and mixer tubes, together with some water vapor evolved therewith, flows upwardly through the tubes and through the dehydrating tower D. The descending sulphuric acid removes the water vapor, and the dehydrated nitric acid vapor flows out of the top of the tower and into the condenser C. A bleacher pipe B is provided between the tower D and the condenser C, and to conserve ceiling height the bleacher pipe B is located alongside of, rather than above the tower D. The nitric acid vapor leaving the tower is therefore first led downwardly through the pipe P before entering and ascending in the bleacher pipe B. The operation of the latter is explained subsequently.

From the bleacher pipe B, the nitric acid gas flows into the condenser C made up of water jacketed tubes connected in series and arranged in vertical superposition in a manner quite similar to the retort tubes 11—17, but the condenser tubes are not provided with dams, and the jackets are supplied with cooling water rather than heat. The cooling water is admitted through pipes 72 and discharged from pipes 74 so that the water and vapor are in counter-flow relation, and the design is such that all of the acid is condensed by the time the end of the condenser is reached.

A suction fan 76 is connected to the outlet of the condenser C and draws undissolved lower oxides of nitrogen, together with air which may have leaked into the system, out of the retort tubes, dehydrater, and condenser. Uncondensed nitric acid vapor will also be drawn off by the fan 76, but in normal operation there is no nitric acid vapor left when the condenser C has been traversed. The discharge pipe 78 from the fan 76 may, if desired, be led to one of the absorption towers in which oxides of nitrogen are first absorbed in order to obtain the dilute nitric acid which eventually is concentrated by the apparatus of the present invention.

The exhauster fan 76 also serves to maintain a slight vacuum throughout the concentrator system. This reduced pressure aids in the desired distillation of nitric acid vapor in the retort tubes R, and consequently the pressure even in the lowermost retort tube should be slightly negative, and, while it is possible to operate a plant with a slightly positive pressure at this point, any increase in positive pressure results in a strong nitric acid content in the residual sulphuric acid discharged from the retort tubes. It may be pointed out at this time that the bleacher pipe B is preferably left without packing, and the dehydrating tower D is only partially filled with a very loose packing in order not to cause too great a pressure differential between the retort tubes R and the condenser C, or, differently expressed, in order to permit of the desired vacuum in the retort R without so great a vacuum in the condenser C as will injuriously affect the condensation in the same.

The nitric acid condensed therein flows downward through the condenser tubes C and then descends in the bleacher pipe B wherein it is exposed to the rising current of hot acid vapor which drives off lower oxides of nitrogen dissolved in the descending acid, thereby bleaching or clearing the color of the acid.

The bleached acid flows into the water jacketed tube T, after which it is led to a conduit 80 running to any suitable storage tank for the concentrated nitric acid. The tube T is connected to the conduit 80 through an upturned pipe circuit 82, so arranged that the tube T is kept full of acid. This volume of acid is considerably warmer at the intake than at the discharge end of the tube T, so that residual oxides of nitrogen may still be driven off therefrom and upward into the bleacher pipe B. The final product is a clear, concentrated nitric acid having a strength of about 97%.

It has previously been explained that in our retort arrangement each of the retort tubes constitutes in effect a retort independent of the other tubes, for each tube has its own body of acid mixture which is not in direct solution contact with the acid mixture in the other tubes, and the liquid level and operating temperature in each tube is adjusted for optimum results, taking into consideration the strength of acid mixture in the particular tube, and the relation of the tube to the preceding and succeeding tubes. However the evolution of nitric acid vapor is a function not only of temperature but also of time. The present process being a continuous one the time of exposure in each retort tube depends upon the velocity of flow of mixture therethrough which in turn depends upon the capacity or output at which the system is operated and the cross sectional area of the tubes. We find that the cross sectional area of the tubes must be made sufficiently great relative to the desired output to keep the flow velocity through the tubes down to a value giving optimum yield. Our experiments indicate that a cross sectional area of from 5 to 20 square inches per ton of nitric acid manufactured daily is satisfactory with a system like that here disclosed and that a cross sectional area of about 8 square inches per daily ton is a preferable value. Too small a cross sectional area of tube results in a poor degree of denitration and may cause the tubes to buck one another. In an already existing plant this factor becomes of importance in determining the most economical capacity at which the plant is to be operated. In the case of a prospective plant being designed this quantity becomes important in determining the selection of the tube diameter to be used for a desired plant capacity.

It will be obvious from an inspection of the drawings that our arrangement is exceedingly economical of floor space, because the bank of retort tubes R is arranged vertically, the bank of condenser tubes C is also arranged vertically, and the dehydrating tower D is placed in vertical alignment therewith. However, this arrangement becomes quite great in height, and one step taken to economize in ceiling height has already been mentioned, in that the bleacher pipe B is placed alongside of instead of in vertical alignment with the dehydrating tower D. Another way in which we economize in ceiling height is the zigzag vertical superposition of the retort and condenser tubes in contrast with a simple vertical alignment. This zigzag arrangement is very clearly shown in Fig. 2 and hardly needs explanation. It will be clear from an inspection of the drawings that the height of each bank of tubes may readily be halved, and meanwhile ample room is provided for standard elbows and fittings, and the latter are all perfectly accessible and readily removable to permit of the removal and replacement of one of the tubes without disturbing the other tubes. The slightly added width of each bank of tubes is of little consequence, inasmuch as this additional width would anyway be needed for various accessories such as the dehydrating tower D, and the like.

In the appended claims we shall refer to the tubes as being in vertical superposition, intending thereby to include the case in which the tubes are arranged all in one vertical plane, as well as the more specific present case in which the tubes are arranged in zigzag vertical superposition or in two vertical planes, because both arrangements are generically alike when contrasted with an arrangement in which the tubes are placed in horizontal collateral relation, or in a step or stairway formation.

The manner of constructing and operating the nitric acid system of our invention will, it is believed, in the main be apparent from the foregoing description thereof. The use of tubes arranged in zigzag vertical superposition economizes in floor space and ceiling height, and permits of the acid mixture in each of the retort tubes being kept isolated from that in the other tubes. Removal of the water vapor distilled from the acid mixture, along with the nitric acid vapor in a separate dehydrating tower permits each of the retort tubes to be operated under the most favorable conditions for distilling the desired vapor therefrom, and each of the tubes is arranged for independent adjustment of the liquid level and the temperature therein, so that these optimum conditions may be provided. The mixer tube insures thorough mixing of the sulphuric and nitric acids, and at the same time takes advantage of the solution heat of the mixture. The size of retort tube is selected in its relation to the desired plant output for best flow velocity and consequent denitration. In general, the degree of purity and of concentration of the product nitric acid is greatly increased.

It will be apparent that while we have shown and described our invention in the preferred form, many changes and modifications may be made in the method and system disclosed without departing from the spirit of the invention, defined in the following claims.

We claim:

1. In the operation of a nitric acid separator or/and concentrator comprising a series of heated retort tubes, the method which includes mixing the dilute nitric acid with sulphuric acid and passing the resulting acid mixture through the retort tubes, and independently controlling the level of the acid mixture in each of the retort tubes relative to the levels in the other tubes in order to obtain the most favorable evolution of nitric acid.

2. In the operation of a nitric acid separator or/and concentrator comprising a series of retort tubes, the method which includes mixing the dilute nitric acid with sulphuric acid and passing the resulting acid mixture through the retort tubes, and independently controlling the temperature in each of the retort tubes relative to the temperatures in the other tubes in order to obtain the most favorable evolution of nitric acid.

3. In the operation of a nitric acid concentrator comprising a series of retort tubes, the method which includes mixing the dilute nitric acid with sulphuric acid and passing the resulting acid mixture through the retort tubes, controlling the flow velocity through the retort tubes, and independently controlling the acid level and the temperature in each of the tubes relative to the levels and temperatures in the other tubes in order to obtain the most favorable evolution of nitric acid.

4. A nitric acid separation or/and concentration system comprising a plurality of vertically superposed retort tubes connected in series and each provided at its discharge end with a dam, a relatively short dehydrating tower connected thereto, a sulphuric acid supply tank arranged to cause sulphuric acid flow through the dehydrating tower and into the retort tubes, a supply tank for dilute nitric acid connected to the retort tubes below the tower, and means to heat the retort tubes.

5. A nitric acid separation or/and concentration system comprising a plurality of vertically superposed retort tubes connected in series and each provided at its discharge end with a dam, a relatively short and loosely packed dehydrating tower connected to the uppermost tube, a condenser connected to the dehydrating tower, suction means connected to the condenser, a sulphuric acid supply tank arranged to cause sulphuric acid flow downwardly through the dehydrating tower and into the retort tubes, a supply tank for dilute nitric acid connected to the retort tubes below the tower, and means to heat the retort tubes.

6. A nitric acid separation or/and concentration system comprising a substantially horizontal mixer tube and a plurality of vertically superposed retort tubes all connected in series and each provided at its discharge end with a dam, a dehydrating tower connected to the mixer tube, a sulphuric acid supply tank arranged to cause sulphuric acid flow through the dehydrating tower and into the mixer tube, a supply tank for dilute nitric acid connected to the mixer tube, and means to heat the retort tubes.

7. A nitric acid separation or/and concentration system comprising a substantially horizontal mixer tube and a plurality of vertically superposed retort tubes all connected in series and each provided at its discharge end with a dam, a loosely packed dehydrating tower connected to the mixer tube, a condenser connected to the dehydrating tower, suction means connected to the condenser, a sulphuric acid supply tank arranged to cause sulphuric acid flow downwardly through the dehydrating tower and into the mixer tube, a supply tank for dilute nitric acid connected to the mixer tube, and means to heat the retort tubes but not the mixer tube.

8. A nitric acid separation or/and concentration system comprising a mixer tube and a plurality of vertically superposed retort tubes all connected in series and each provided at its discharge end with a dam, a dehydrating tower connected to the mixer tube, a condenser connected to the top of the dehydrating tower through an upright bleacher pipe means to drain nitric acid from the bottom of the bleacher pipe, suction means connected to the condenser, a sulphuric acid supply tank arranged to cause sulphuric acid flow downwardly through the dehydrating tower and into the mixer tube, a supply tank for dilute nitric acid connected to the mixer tube, and means to heat the retort tubes.

9. A nitric acid separation or/and concentration system comprising a plurality of retort tubes all connected in series and each provided at its discharge end with a dam, a dehydrating tower connected thereto, a sulphuric acid supply tank arranged to cause sulphuric acid flow through the dehydrating tower and into the retort tubes, a supply tank for dilute nitric acid connected to the series of retort tubes, and independent means to heat the several retort tubes so that the temperature in some of the tubes may be controlled independently of the temperature in the remaining tubes.

10. A nitric acid separation or/and concentration system comprising a plurality of vertically superposed retort tubes all connected in series and each provided at its discharge end with a dam, a dehydrating tower connected to the uppermost tube, a condenser connected to the dehydrating tower, a sulphuric acid supply tank arranged to cause sulphuric acid flow downwardly through the dehydrating tower and into the retort tubes, a supply tank for dilute nitric acid connected to the series of retort tubes, and means to heat the retort tubes comprising individual steam jackets for each of the tubes and individual steam supply pipes connected thereto so that the temperature in each of the tubes may be controlled independently of the temperature in the remaining tubes.

11. A nitric acid separation or/and concentration system including a plurality of vertically superposed substantially horizontal retort tubes connected in series, and means for adjusting the liquid content in each of the tubes independently of the other tubes.

12. A nitric acid separation or/and concentration system including a plurality of vertically superposed substantially horizontal retort tubes connected in series, and means for adjusting the liquid content in each of the tubes independently of the other tubes comprising an adjustable dam inserted at the discharge end of each of said tubes, said dams being so adjusted that the liquid content is greater in the lower than in the higher tubes.

13. A nitric acid separation or/and concentration system including a plurality of vertically superposed substantially horizontal retort tubes connected in series, means for adjusting the liquid content in each of the tubes independently of the other tubes, and independent means to heat the several retort tubes so that the temperature in some of the tubes may be controlled independently of the temperature in the other tubes.

14. A nitric acid separation or/and concentration system comprising a plurality of vertically superposed retort tubes connected in series, means for adjusting the liquid content in each of the tubes independently of the other tubes, a dehydrating tower connected thereto, a sulphuric acid supply tank arranged to cause sulphuric acid flow through the dehydrating tower and into the retort tubes, a supply tank for dilute nitric acid connected to the series of retort tubes, and means to heat the retort tubes.

15. A nitric acid seperation or/and concentration system comprising a plurality of vertically superposed retort tubes connected in series, means for adjusting the liquid content in each of the tubes independently of the other tubes comprising an adjustable dam inserted at the discharge end of each of said tubes, a dehydrating tower connected to the uppermost tube, a condenser connected to the dehydrating tower, a sulphuric acid supply tank arranged to cause sulphuric acid flow downwardly through the dehydrating tower and into the retort tubes, a supply tank for dilute nitric acid connected to the retort tubes, and means to heat the retort tubes.

16. A nitric acid separation or/and concentration system comprising a plurality of vertically superposed retort tubes connected in series, means for adjusting the liquid content in each of the tubes independently of the other tubes, a dehydrating tower connected to the uppermost tube, a sulphuric acid supply tank arranged to cause sulphuric acid flow downwardly through the dehydrating tower and into the retort tubes, a supply tank for dilute nitric acid connected to the series of retort tubes, and independent means to heat the several retort tubes so that the temperature in some of the tubes may be controlled independently of the temperature in the other tubes.

17. An nitric acid separation or/and concentration system comprising a mixer tube and a plurality of retort tubes all connected in series and each provided with means for adjusting the liquid content in each of the tubes independently of the other tubes, a dehydrating tower connected to the mixer tube, a sulphuric acid supply tank arranged to cause sulphuric acid flow downwardly through the dehydrating tower and into the mixer tube, a supply tank for dilute nitric acid connected to the mixer tube, and independent means to heat the retort tubes so that the temperature in some of the tubes may be controlled independently of the temperature in the other tubes.

18. A nitric acid separation or/and concentration system comprising a mixer tube and a plurality of vertically superposed retort tubes all connected in series and each provided with means for adjusting the liquid content in each of the tubes independently of the other tubes, a dehydrating tower connected to the mixed tube, a condenser connected to the top of the dehydrating tower through an upright bleacher pipe, means to drain nitric acid from the bottom of the bleacher pipe suction means connected to the condenser, a sulphuric acid supply tank arranged to cause sulphuric acid flow downwardly through the dehydrating tower and into the mixer tube, a supply tank for dilute nitric acid connected to the mixer tube, and independent means to heat each of the retort tubes so that the temperature in each of the tubes may be controlled independently of the temperature in the other tubes.

19. A nitric acid separation or/and concentration system comprising a mixer tube and a plurality of vertically superposed retort tubes all connected in series and each provided at its discharge end with an independently adjustable dam for adjusting the liquid content in each of the tubes independently of the other tubes, a dehydrating tower conected to the mixer tube, a condenser connected to the top of the dehydrating tower through an upright bleacher pipe, means to drain nitric acid from the bottom of the bleacher pipe suction means connected to the condenser, a sulphuric acid supply tank arranged to cause sulphuric acid flow downwardly through the dehydrating tower and into the mixer tube, a supply tank for dilute nitric acid connected to the mixer tube, and means to heat the retort tubes comprising individual steam jackets for each of the tubes and individual steam supply pipes connected thereto so that the temperature in each of the tubes may be controlled independently of the temperature in the other tubes.

20. A nitric acid separation or/and concentration system comprising a plurality of horizontal retort tubes connected in series and arranged in zigzag vertical superposition when considered in side elevation and also when considered in end elevation, in order to conserve both floor space and ceiling height, each of said tubes being provided with means for adjusting the liquid content in each of the tubes independently of the other tubes.

21. An nitric acid separation or/and concentration system comprising a plurality of horizontal retort tubes connected in series and arranged in zigzag vertical superposition when considered in side elevation and also when considered in end elevation in order to conserve both floor space and ceiling height, each of said tubes being provided at its dicharge end with an independently adjustable dam for adjusting the liquid content in each of the tubes independently of the other tubes.

22. A nitric acid separation or/and concentration system comprising a plurality of retort tubes connected in series and provided at their discharge ends with means for obstructing and retaining a body of liquid therein, a dehydrating tower connected to said series of retort tubes, and means to heat said tubes.

23. A nitric acid separation or/and concentration system comprising a mixer tube and a plurality of retort tubes connected in series and provided at their discharge ends with means for obstructing and retaining a body of the liquid therein, means to heat the retort tubes, and a dehydrating tower connected to the mixer tube.

24. A nitric acid separation or/and concentration system including a plurality of retort tubes connected in series, and means for adjusting the liquid content in each of the tubes independently of the other tubes.

25. In the operation of a nitric acid separation or/and concentrator comprising a series of heated retort tubes, the method which includes mixing the dilute nitric acid with sulphuric acid and passing the resulting acid mixture through the retort tubes, independently controlling the level of the acid mixture in each of the retort tubes relative to the levels in the other tubes in order to obtain the most favorable evolution of nitric acid, and passing the resulting nitric acid vapor and the water vapor evolved therewith in counter-current relation to the sulphuric acid going into the acid mixture.

26. In the operation of a nitric acid separator or/and concentrator comprising a series of retort tubes, the method which includes mixing the dilute nitric acid with sulphuric acid and passing the resulting acid mixture through the retort tubes, independently controlling the temperature in each of the retort tubes relative to the temperatures in the other tubes in order to obtain the most favorable evolution of nitric acid, and passing the resulting nitric acid vapor and the water vapor evolved therewith in counter-current relation to the sulphuric acid going into the acid mixture.

27. In the operation of a nitric acid separator or/and concentrator comprising a series of retort tubes, the method which includes mixing the dilute nitric acid with sulphuric acid and passing the resulting acid mixture through the retort tubes, controlling the flow velocity through the retort tubes, independently controlling the acid level and the temperature in each of the tubes relative to the levels and temperatures in the other tubes in order to obtain the most favorable evolution of nitric acid, and passing the resulting nitric acid vapor and the water vapor evolved therewith in counter-current relation to the sulphuric acid going into the acid mixture.

28. A denitration system for the separation of nitric acid from a mixture of liquids, comprising a mixer tube and a plurality of retort tubes all arranged substantially horizontal and all connected in series and each provided at its discharge end with means for obstructing and retaining a body of the liquid mixture therein, means to create a marked difference in temperature between the retort tubes on the one hand and the mixer tube on the other hand, the retort tubes being kept at high temperature, and a dehydrating tower connected to the mixer tube.

29. A denitration system for the separation of nitric acid from a mixture of liquids comprising a mixer tube and a plurality of retort tubes all arranged substantially horizontally and all connected in series and each provided at its discharge end with means for obstructing and retaining a body of the liquid mixture therein, means to heat the retort tubes but not the mixer tube, and a dehydrating tower connected to the mixer tube.

Signed by said INGENUIN HECHENBLEIKNER at Charlotte, in the county of Mecklenburg and State of North Carolina this 26 day of April A. D. 1930.

INGENUIN HECHENBLEIKNER.

Signed by said SAMUEL F. SPANGLER at Buffalo, in the county of Erie and State of New York this 29th day of April A. D. 1930.

SAMUEL F. SPANGLER.